United States Patent Office 3,320,259
Patented May 16, 1967

3,320,259
DIBENZOCYCLOHEPTEN-5-YLPIPERAZINES
John W. Cusic, Skokie, and Peter Yonan, Chicago, Ill., assignors to G. D. Searle & Co., Chicago, Ill., a corporation of Delaware
No Drawing. Filed Mar. 25, 1966, Ser. No. 537,302
Claims priority, application Great Britain, Apr. 12, 1965, 15,469/65
2 Claims. (Cl. 260—268)

The present invention relates to a group of dibenzocycloheptenyl compounds. More particularly, it relates to a group of compounds having the following general formula

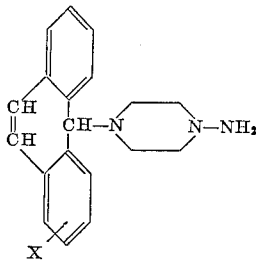

wherein X is selected from the group consisting of hydrogen, methyl, and halogen. The halogens referred to above include fluorine, chlorine, bromine, and iodine.

The compounds of this invention are useful because of their pharmacological properties. In particular, they possess anti-ulcer activity which is demonstrated by their inhibition of ulceration in the Shay rat. They also possess activity as pepsin inhibitors. These compounds further show activity as anti-inflammatory agents. This is demonstrated by their phenylbutazone-like effect on edematous conditions.

The compounds of the present invention also possess anti-biotic activity against a variety of organisms. Thus, they inhibit the growth of bacteria such as *Diplococcus pneumoniae*, protozoa such as *Tetrahymena gelleii*, and algae such as *Chlorella vulgaris*.

The organic bases of this invention form non-toxic acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

To obtain the compounds of the present invention, the appropriate 1 - (5H - dibenzo[a,d]cyclohepten - 5-yl)-4-nitrosopiperazine is reduced. Various agents can be used for this purpose although lithium aluminum hydride is particularly preferred. The intermediate nitroso compound is obtained from the reaction of 1-nitrosopiperazine with a 5-halo-5H-dibenzo[a,d]cycloheptene.

The nitroso compound referred to above can also be obtained by the reaction of 1-(5H-dibenzo[a,d]cyclohepten-5-yl)piperazine with nitrous acid.

The following examples are presented to further illustrate the present invention; they should not be construed as limiting it in spirit or in scope. In these examples, quantities are indicated in parts by weight and temperatures in degrees centigrade (° C.).

Example 1

To a solution of 45 parts of 5-chloro-5H-dibenzo[a,d]cycloheptene in 560 parts of 2-butanone is added 55 parts of potassium carbonate and then 24 parts of 1-nitrosopiperazine. This mixture is stirred at room temperature for 23 hours and then refluxed for 3 hours. The mixture is then filtered, and the solvent is evaporated from the filtrate under reduced pressure to leave a residual solid. Ether is added to this solid which is filtered to give 1-(5H-dibenzo[a,d]cyclohepten-5-yl)-4-nitrosopiperazine melting at about 184–185° C.

Example 2

A solution of 26 parts of 1-(5H-dibenzo[a,d]cyclohepten-5-yl)-4-nitrosopiperazine in 135 parts of tetrahydrofuran is added portionwise with stirring to a suspension of 10 parts of lithium aluminum hydride in 765 parts of tetrahydrofuran. The addition is carried out over a period of 25 minutes at a temperature of about 30° C. The mixture is then stirred at this temperature for an additional 15 minutes before it is cooled to 5° C. and decomposed by the cautious dropwise addition of (1) 15 parts of water in 27 parts of tetrahydrofuran, then (2) 10 parts of sodium hydroxide in 20 parts of water, and finally (3) 25 parts of water. The mixture is then filtered to remove the salts which are washed with hot tetrahydrofuran. The combined filtrate is dried and the solvent is evaporated to leave a residual solid. Hexane is added to this residue which is then filtered to give 1-(5H-dibenzo[a,d]cyclohepten-5-yl)-4-aminopiperazine melting at about 165–167° C. This compound has the following formula

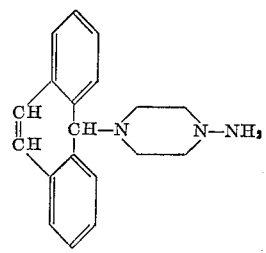

Example 3

An equivalent quantity of 3,5-dichloro-5H-dibenzo[a,d]cycloheptene is substituted for the 5-chloro-5H-dibenzo[a,d]cycloheptene and the procedure of Example 1 is repeated to give 1-(3-chloro-5H-dibenzo[a,d]cyclohepten-5-yl)-4-nitrosopiperazine. This nitroso compound is then reduced with lithium aluminum hydride according to the procedure described in Example 2 to give 1-(3-chloro - 5H - dibenzo[a,d]cyclohepten - 5 - yl) - 4 - aminopiperazine.

What is claimed is:
1. A compound of the formula

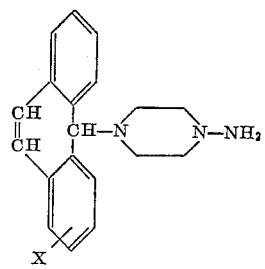

wherein X is selected from the group consisting of hydrogen and chlorine.

2. A compound according to claim 1 which is 1-(5H-dibenzo[a,d]cyclohepten-5-yl)-4-aminopiperazine.

References Cited by the Examiner

UNITED STATES PATENTS 3,168,523   2/1965   Cusic _____ 260—268

OTHER REFERENCES

Villani et al.: J. Med. and Pharm. Chem., vol. 5, No. 2 (1962), pages 373–74.

ALEX MAZEL, *Primary Examiner.*

HENRY JILES, *Examiner.*